Feb. 1, 1927.

D. P. FLEEGER ET AL 1,616,119

APPARATUS FOR PURIFYING CRUDE OIL

Filed Dec. 1, 1921      4 Sheets-Sheet 1

D.P. Fleeger and
F.P. Osborn.
Inventors

By C.A.Snow & Co.
Attorney

Feb. 1, 1927. 1,616,119
D. P. FLEEGER ET AL
APPARATUS FOR PURIFYING CRUDE OIL
Filed Dec. 1, 1921    4 Sheets-Sheet 2
Fig. 2.
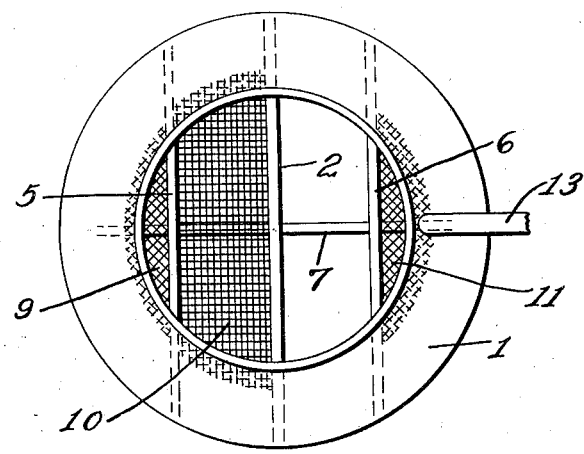
Fig. 5.
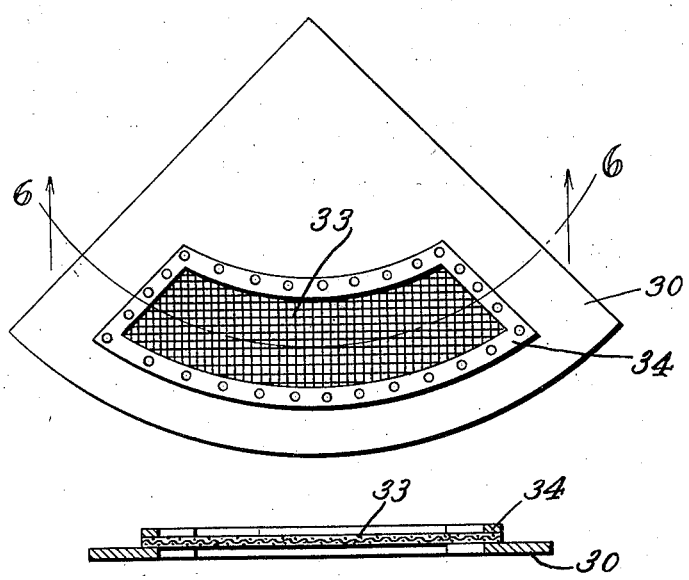
Fig. 6.
Inventors,
D. P. Fleeger and
F. P. Osborn.
By C. A. Snow & Co.
Attorney Feb. 1, 1927.
D. P. FLEEGER ET AL
1,616,119
APPARATUS FOR PURIFYING CRUDE OIL
Filed Dec. 1, 1921    4 Sheets-Sheet 3

Inventors,
D. P. Fleeger and
F. P. Osborn.
By C. A. Snow & Co.
Attorney

Feb. 1, 1927. 1,616,119
D. P. FLEEGER ET AL
APPARATUS FOR PURIFYING CRUDE OIL
Filed Dec. 1, 1921   4 Sheets-Sheet 4
*Fig. 7.*
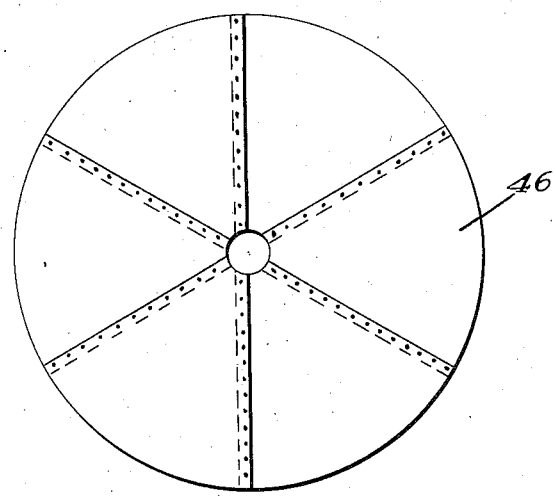
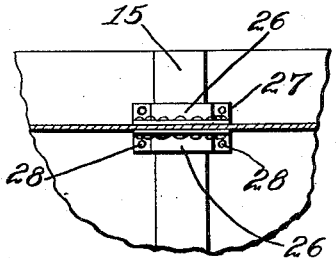
*Fig. 9.*  *Fig. 8.*  *Fig. 11.*
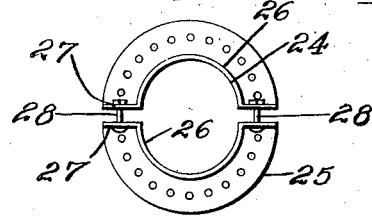
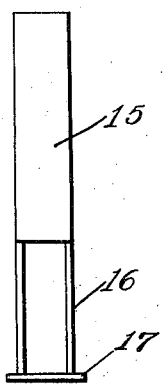
*Fig. 10.*
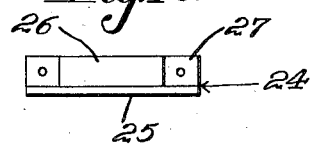
Inventors
D. P. Fleeger and
F. P. Osborn.
By C. A. Snow & Co.
Attorney

UNITED STATES PATENT OFFICE.

DAVID P. FLEEGER AND FRED P. OSBORN, OF WICHITA, KANSAS.

APPARATUS FOR PURIFYING CRUDE OIL.

Application filed December 1, 1921. Serial No. 519,183.

This invention relates to apparatus for separating water and other foreign substances from crude oil.

By way of explanation it may be stated that in the course of a year the loss of oil occurring throughout the United States amounts to millions of barrels due to the fact that wells producing both water and oil cause the formation of what is known in the oil country as cut oil. Analyses of these oils show that the water is mixed with the oil in minute particles, each particle or drop of water being inclosed in a film of oil. The amount of water is so small that the minute globule thereof will not break the oil film. Consequently the water remains in the oil and renders it unfit for refining purposes and also destroys its usefulness as a fuel. Thus the product becomes a total loss to the producer.

Various means have been tried for recovering some of the oil thus mixed with water. A small percentage can be recovered by running the product into earthen storage and allowing it to weather. Another method pursued is the application of heat but both methods are only partial successes because the separation desired is not complete and there is a great loss through evaporation.

It is an object of the present invention to provide means by which the water and other impurities can be removed almost entirely from the crude oil by forcing the same through a series of tanks of novel construction and which form a system capable of handling hundreds of millions of barrels of oil without further expense for replacement following the initial installation.

Another object is to provide apparatus which does not require concentrated lye or other chemical ingredients in order to effect the necessary purification.

With the foregoing and other objects in view the invention consists of certain details of construction of the apparatus which will be hereinafter pointed out, it being understood that various changes may be made in the method and in the construction of the apparatus used, within the scope of the appended claim, without departing from the spirit of the invention.

In the accompanying drawings the preferred form of apparatus has been illustrated.

In said drawings—

Figure 2 is a plan view of the first tank of the apparatus.

Figure 5 is a plan view of one of the sections of the intermediate baffle.

Figure 6 is a section on line 6—6, Figure 5.

Figure 7 is a plan view of the baffle used in the settling tank.

Figure 8 is an enlarged view partly in section and partly in elevation showing a clamp used for attaching a baffle to the center pipe in one of the tanks.

Figure 9 is a plan view of one of the clamps.

Figure 10 is a side elevation of one of the clamp members.

Figure 11 is an elevation of one of the center pipes of a tank.

Figure 1:
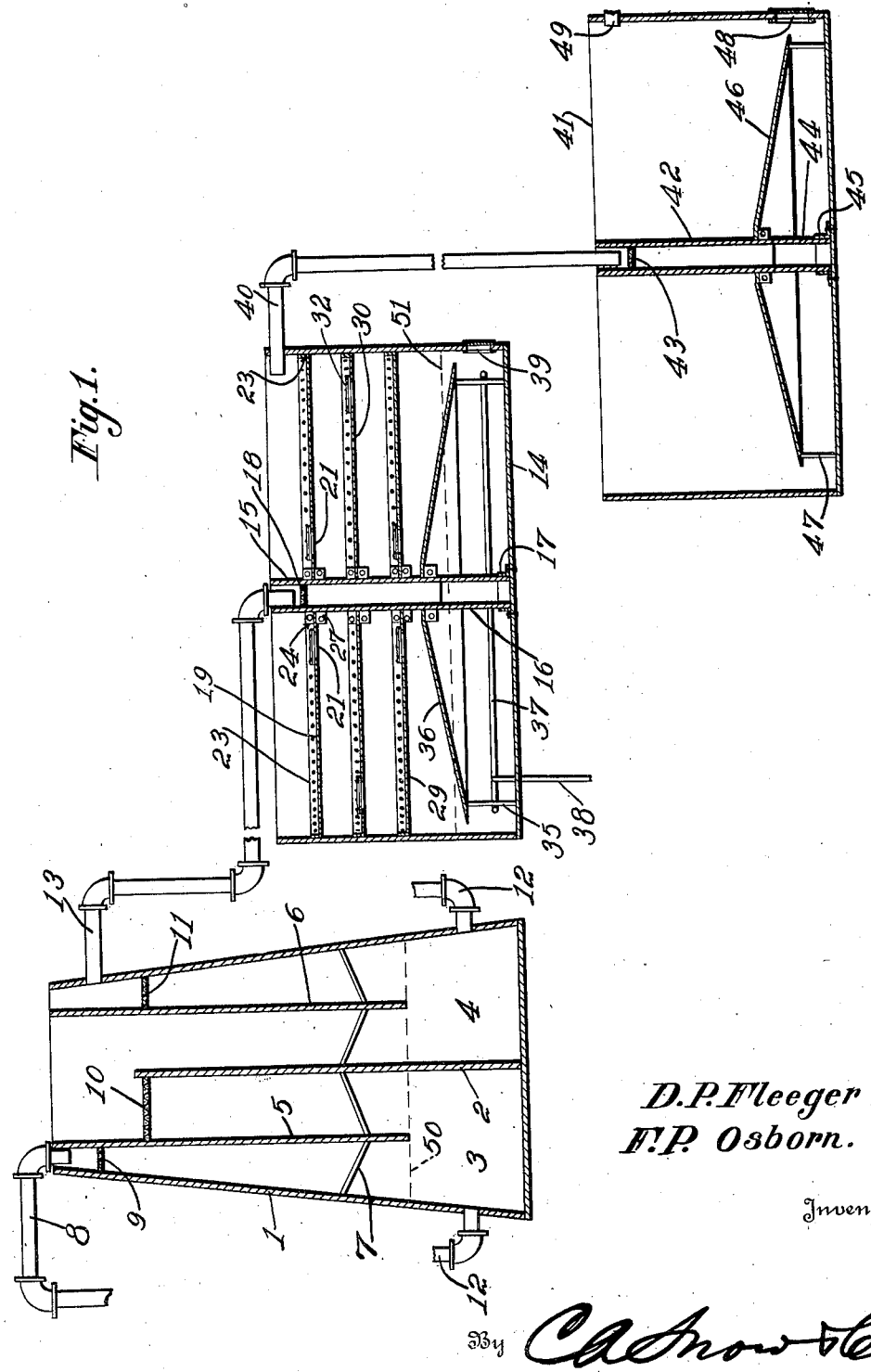
Figure 1 is a section through the apparatus, parts being shown in elevation.

Referring to the figures by characters of reference 1 designates a frusto-conical receiving tank open at the top and having a diametrical partition 2 extending upwardly from the bottom thereof and terminating at a point below the top, this partition dividing the lower portion of the tank into two chambers 3 and 4 respectively.

Supported within the chamber 3 is another partition 5 extending from the top of the tank downwardly to a point a desired distance from the bottom, there being another partition 6 similar to the partition 5 and supported within the chamber 4. All of these partitions are parallel and they can be connected near the lower ends of the partitions 5 and 6 by means of braces 7. A supply pipe 8 opens into the upper portion of the tank between the partition 5 and the wall of the tank and a screen 9 is arranged between said partition and wall so that all liquid discharged into the tank must pass through the screen. This screen is of a fine mesh and another fine mesh screen 10 extends across the space between the partition 5 and the top portion of the partition 2. A third fine mesh screen 11 is arranged in the same plane with the screen 10 but between the partition 6 and the wall of the tank 1. Water drips or outlets 12 are extended from the lower portion of each of the chambers 3 and 4 and an outflow pipe 13 extends from the upper portion of the tank at a point above the screen 11.

Figure 3:
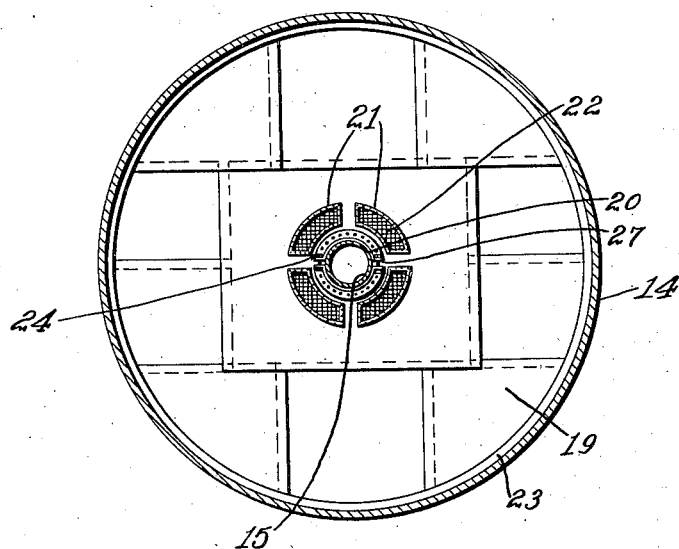
Figure 3 is a plan view of the steaming tank.

The pipe 13 is designed to conduct oil to a steaming tank 14. Supported on the center of the bottom of this tank is a stand pipe 15 the open upper end of which is flush with the top of the tank while the lower end, which is cut away longitudinally to provide supporting legs 16 is provided with a flanged collar 17 riveted or otherwise attached to the bottom of the tank. The pipe 13 discharges downwardly into the upper end of the stand pipe 15 and onto a fine mesh screen 18 secured in the upper portion of the stand pipe. A baffle made up of a plurality of plates fastened together by rivets or in any other suitable manner and which has been indicated at 19 in Figure 3 forms a horizontal partition having a central opening 20 through which the pipe 15 extends. A series of arcuate openings 21 is formed in this baffle 19 close to the pipe opening 20 and these openings are concentric with the opening 20. Fine mesh screens 22 are secured over the openings 21. A flange 23 is provided at the periphery of the baffle 19 and is riveted or otherwise secured to the wall of the tank 14.

Secured to the stand pipe 15 above and below the baffle 19 are arcuate clamp members 24 arranged in pairs, each clamp member having a base flange 25 and an upstanding arcuate flange 26 together with terminal radial flanges or ears 27. The flanges 26 embrace the stand pipe and are held thereto firmly by clamping bolts 28 extended through the terminal flanges or ears 27 and after a pair of clamp members has been applied to the pipe above and below the baffle the flanges 25 of the clamp members can be riveted or otherwise fastened to the baffle.

Figure 4:
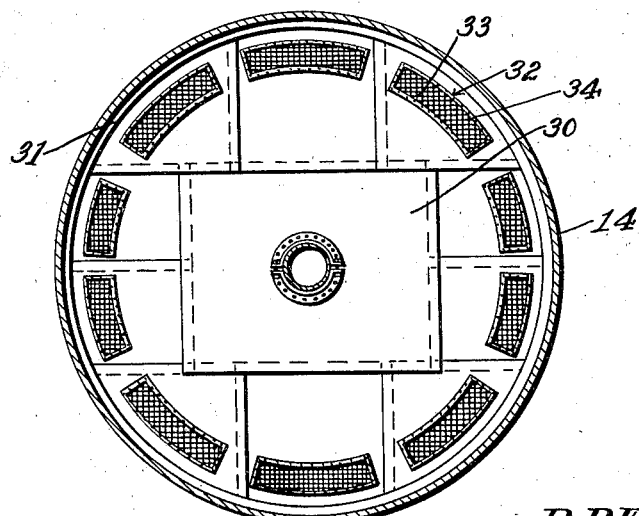
Figure 4 is a horizontal section through the steaming tank showing the intermediate baffle.

The baffle 19 is duplicated by another baffle 29 located adjacent the center of the wall of the tank and arranged between these two baffles 19 and 29 is another baffle 30 illustrated in detail in Figure 4 and which is also made up of a series of plates fastened together by rivets or the like. The pipe 15 is extended through the center of the baffle where it is attached to the baffle by means of clamps such as have heretofore been described. Adjacent the periphery of the baffle is an annular series of arcuate openings 32 each covered with a fine mesh wire screen 33. As shown in Figures 5 and 6 a screen can be attached to the baffle by fastening its edges between a frame 34 and the baffle 30, rivets being used for this purpose. All of the screens can be fastened in this way and the screens on the baffles 19 and 29 can be similarly secured.

Mounted on suitable supports 35 upstanding from the bottom of the tank 14 is a conical baffle 36 through the center of which extends the pipe 15, this baffle being attached to this pipe by a pair of clamps similar to those heretofore described. The periphery of the baffle 36 is spaced from the wall of the tank. A steam heating coil 37 is mounted in the lower portion of the tank and under the baffle 36, this coil being in communication with a suitably located supply pipe 38. A man hole 39 is provided in the wall of the tank close to the bottom thereof and is normally closed as shown, this man hole being used for the purpose of cleaning out the tank.

An outflow pipe extends from the upper portion of the tank and serves to convey liquid to the settling tank 41 of the apparatus. This settling tank has a central stand pipe 42 in the upper portion of which is mounted a fine mesh screen 43. The pipe 40 discharges into the stand pipe above the screen and the lower portion of the stand pipe is cut away longitudinally to provide legs 44 secured at their lower ends to an attaching ring 45 riveted or otherwise secured to the bottom of the tank.

A frusto-conical baffle 46 is mounted at its center on the stand pipe and is held thereto by clamps such as have heretofore been described, the periphery of this baffle being spaced from the wall of the tank and being supported by standards 47. A normally closed man hole 48 is formed in the bottom portion of the wall of the tank and constitutes means whereby the tank can be cleaned readily. An outflow pipe 49 extends from the upper portion of the tank 41.

In operation the oil to be treated is directed into the receiving tank 1 from the pipe 8 and passes downwardly through the screen 9 which serves to break up the small globules of oil and water. The water will thus separate from the oil and the level of the water will be maintained at the lower ends of the partitions 5 as indicated by the dotted line 50. As the oil is lighter than the water it will rise above the water level and within the space between partition 2 and partition 5, passing through the second screen 10 where a further separation takes place. The water separated at this point will gravitate within the chamber 3 while the oil will flow over the partition 2 and into the chamber 4. Here it will pass under the partition 6 and upwardly through the screen 11 where a third separation takes place, the water gravitating within the chamber 4 and being maintained at the level 50 by the pipe 12. From the tank 1 the oil is conveyed to the stand pipe 15. Here it flows downwardly through the screen 18 and is delivered into the lower portion of the tank 14. A further separation of oil and water takes place at the screen 18, the water level in the tank being maintained as shown at 51. The steam coil 37 serves to thoroughly heat the contents of this tank to effect a further separation and the oil will be forced upwardly through the screens in the baffles, following a circuitous path and finally flowing outwardly through the pipe 40. From pipe 40 the oil is conducted to the settling tank 41, the oil being spread radially by the baffle 46 and finally passing out through the pipe 49. The steam coil 37 is designed primarily to keep the oil warm and in a thin condition in extremely cold weather.

While the present apparatus has been illustrated as consisting of three tanks it is to be understood that this number may be reduced in those localities where a smaller percentage of cut oil is present.

Importance is attached to the fact that the oil is handled automatically and that the breaking power whereby the globules of film encased water are fractured, is furnished solely by gravity, thus obviating the necessity of using pumps or other power apparatus.

What is claimed is:—

In apparatus of the class described a tank, a stand pipe therein having an inlet at its upper end and an outlet at its lower end, said outlet being in communication with the bottom portion of the tank, superposed parallel partitions fitted around the stand pipe and extending to the wall of the tank, there being screened openings within the partition but out of alinement, said partitions constituting superposed baffles, a frusto-conical baffle fitted about the stand pipe between the lower partition and the bottom of the tank and spaced therefrom, said baffle extending close to but spaced from the wall of the tank, and a heating means interposed between the bottom of the tank and the frusto-conical baffle, said tank having an outlet above the level of the upper partition.

In testimony that we claim the foregoing as our own, we have hereto affixed our signatures.

DAVID P. FLEEGER.
FRED P. OSBORN.